United States Patent [19]
Turner et al.

[11] Patent Number: 6,003,415
[45] Date of Patent: Dec. 21, 1999

[54] TOOLHOLDER WITH CAM LOCKING MECHANISM

[75] Inventors: Jim Turner, Livingston; Samuel Goertz, Harper, both of Tex.

[73] Assignee: Houston Instrument Tooling Company, Inc., Livingston, Tex.

[21] Appl. No.: 08/935,850

[22] Filed: Sep. 23, 1997

[51] Int. Cl.[6] .................................................. B23B 29/24
[52] U.S. Cl. .............................. 82/159; 82/161; 82/121; 408/35; 29/40
[58] Field of Search .............................. 82/159, 158, 161, 82/121; 29/35.5, 39, 40, 41; 408/35

[56] References Cited

U.S. PATENT DOCUMENTS

| | | | |
|---|---|---|---|
| 895,788 | 8/1908 | Potter | 82/159 X |
| 2,684,608 | 7/1954 | Roman | 82/158 |
| 2,730,918 | 1/1956 | Dagusta . | |
| 3,280,673 | 10/1966 | Holmes et al. | 82/158 |
| 3,425,305 | 2/1969 | Cocco | 82/161 |
| 3,455,191 | 7/1969 | Graf . | |
| 3,489,042 | 1/1970 | Papp . | |
| 3,735,461 | 5/1973 | Andrews, Sr. . | |
| 4,111,083 | 9/1978 | Carter . | |
| 4,164,880 | 8/1979 | DiMarco . | |
| 4,951,536 | 8/1990 | Robertson . | |
| 5,031,491 | 7/1991 | Hofmann . | |

FOREIGN PATENT DOCUMENTS

| | | | |
|---|---|---|---|
| 343202 | 3/1986 | Germany . | |
| 0782324 | 9/1957 | United Kingdom | 82/159 |

*Primary Examiner*—Andrea L. Pitts
*Assistant Examiner*—Henry W. H. Tsai
*Attorney, Agent, or Firm*—Sankey & Luck, L.L.P.

[57] ABSTRACT

The invention relates to toolholders and mechanisms for securing the toolholder to a lathe turret or tool indexer. One embodiment of the invention comprises a base adapted to be secured to a rotary lathe table via a mechanism receivable in slots or grooves which can be wedged and compressively secured about selected positions about an engagement surface. A second embodiment comprises a bore securable to a lathe table via both fastening and positioning mechanisms where the bore defines a dovetail groove receivable to a complementary tongue where the toolholder is securable to the bore in a cam locking mechanism.

13 Claims, 8 Drawing Sheets

TOOLHOLDER WITH CAM LOCKING MECHANISM

BACKGROUND OF THE INVENTION

1. Field of the Invention

The present invention generally relates to toolholders. More specifically, the present invention relates to toolholders and mechanisms for securing the toolholder to a lathe turret or tool indexer.

2. Description of the Prior Art

Conventional lathe turrets are designed with a plurality of toolholder positions capable of receiving toolholders needed to perform a variety of metal working operations such as turning, shaping, grooving and threading. The CHNC lathe is characterized by T-shaped slots adapted to receive the toolholder. A COBRA lathe is characterized by a groove or depression formed in the lathe table. When the lathe is set up with proper tools, it can be programmed to perform a variety of metal working operations in a predefined sequence without human intervention between metal working operations to change tools.

Such traditional toolholders have a number of disadvantages. One such disadvantage is the difficulty encountered in realigning the tool to set reference positions when the tool is changed or re-sharpened. In the past, time consuming and sometimes risky procedures have been necessary to establish these reference positions.

Another disadvantage of prior art toolholders include the difficulty of establishing the cutting edge of the tool on center-line with the work piece. To achieve proper alignment oftentimes entailed the use of shims or other modifications. Prior toolholders utilizing wedges also require the time consuming alignment procedures outlined above.

SUMMARY OF THE INVENTION

The present invention addresses the above and other disadvantages of prior art toolholders.

One embodiment of the toolholder of the present invention is adapted for use with CHNC tool lathes and generally comprises a base adapted to be secured to a rotary lathe table. In this first embodiment, the base is secured to the lathe table via the use of means receivable in slots or grooves disposed in the lathe table which can be both wedged and compressively secured about selected positions along the engagement surface. The base is receivable to a toolholder via a dovetail slot, where the toolholder may be secured relative the base via a cam locking arrangement.

A second embodiment of the invention is adapted for use with a COBRA tool lathe and generally comprises a base adapted to be secured to the lathe table via both fastening and positioning means. The base defines a dovetail groove about its upper, engagement surface receivable to a complimentary tongue formed on the toolholder. The toolholder is securable to the base via a cam locking mechanism and preferably includes attachment means to hold a variety of tools relative to the workpiece.

The present invention presents a number of advantages over prior art tool assemblies. One such advantage is a quick release feature which enables faster turnaround for sharpening and set-ups of the tool.

Another advantage of the present invention is the capacity to qualify and easily add additional tools to the tool turret. Yet another advantage of the present invention is the ability to adjust the tooling to center-line without the loss of reference locations.

Yet additional benefits and advantages of the present invention will become obvious to one skilled in the art in light of the following description of the preferred embodiment.

DETAILED DESCRIPTION OF THE PREFERRED EMBODIMENTS

Figure 1:
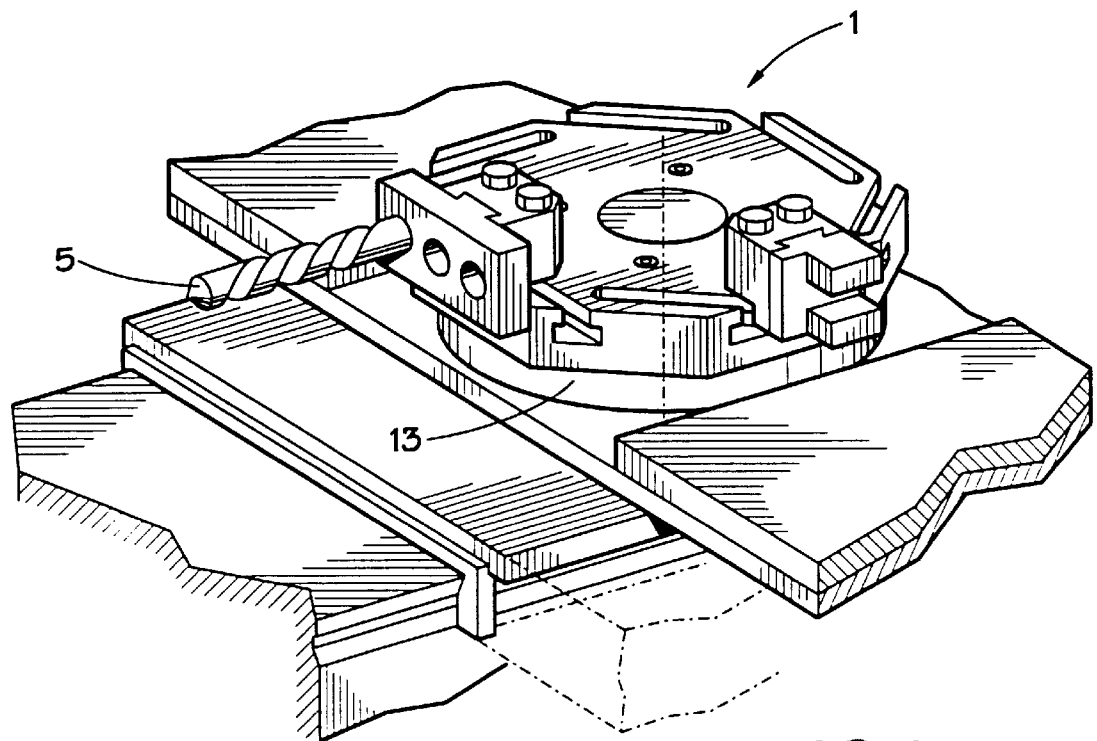
FIG. 1 illustrates a perspective, fragmentary view of a CHNC tool lathe incorporating one embodiment of the present invention.

An illustration of a first embodiment of the present invention may be seen by reference to FIGS. 1–9. By reference to FIGS. 1–2, the toolholder assembly of this embodiment is adapted for use with a rotary CHNC tool lathe 1 and generally comprises a base 4 and a toolholder 6.

By reference to FIGS. 1–9, base 4 is adapted to be secured to the lathe 1 via a fastening means which comprises one or more bolts 24 slidably and rotatably disposed in bores 29 formed is said base 4, where the threaded, distal ends 23 of said bolts 24 include means 25 to rotate said bolts 24 when threadedly mated to nuts 22. (See FIG. 9.) Bolts 24 include at their proximal end a shank defining an eccentric cam 27.

When disposed through bores 29 and mated to nuts 22, bolts 24 define a means to fasten base 4 to the lathe table 13 by sliding the head 9 of said bolts 24 into the slot or groove 12 formed in lathe table 13. In the embodiment illustrated in FIG. 5, groove 12 defines an inverted "T" shape, where the diameter of bolt head 9 is narrower than the width of the track or lower part 17 but wider than the width of the upper portion 21 of groove 12, in the manner illustrated. In such a fashion, base 4 may be slidably disposed at any point along the length of slot 12, which may be marked with graduations about its top surface as an aid in repositioning.

Figure 5:
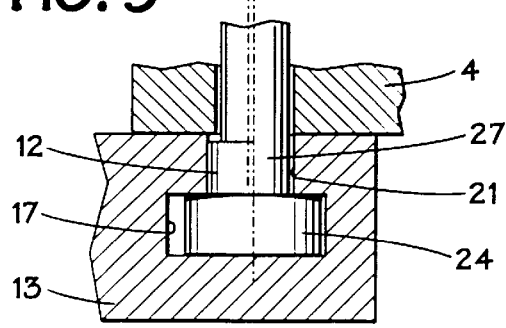
FIG. 5 illustrates a detail, cross sectional view as taken through the plane described by 5—5 in FIG. 3.
Figure 6:
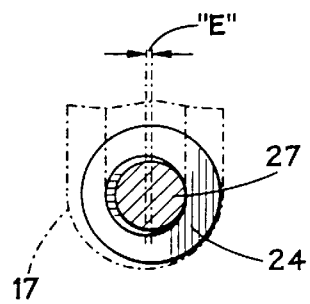
FIG. 6 illustrates a top view of the cam locking mechanism employed in the CHNC embodiment of the present invention.
Figure 7:
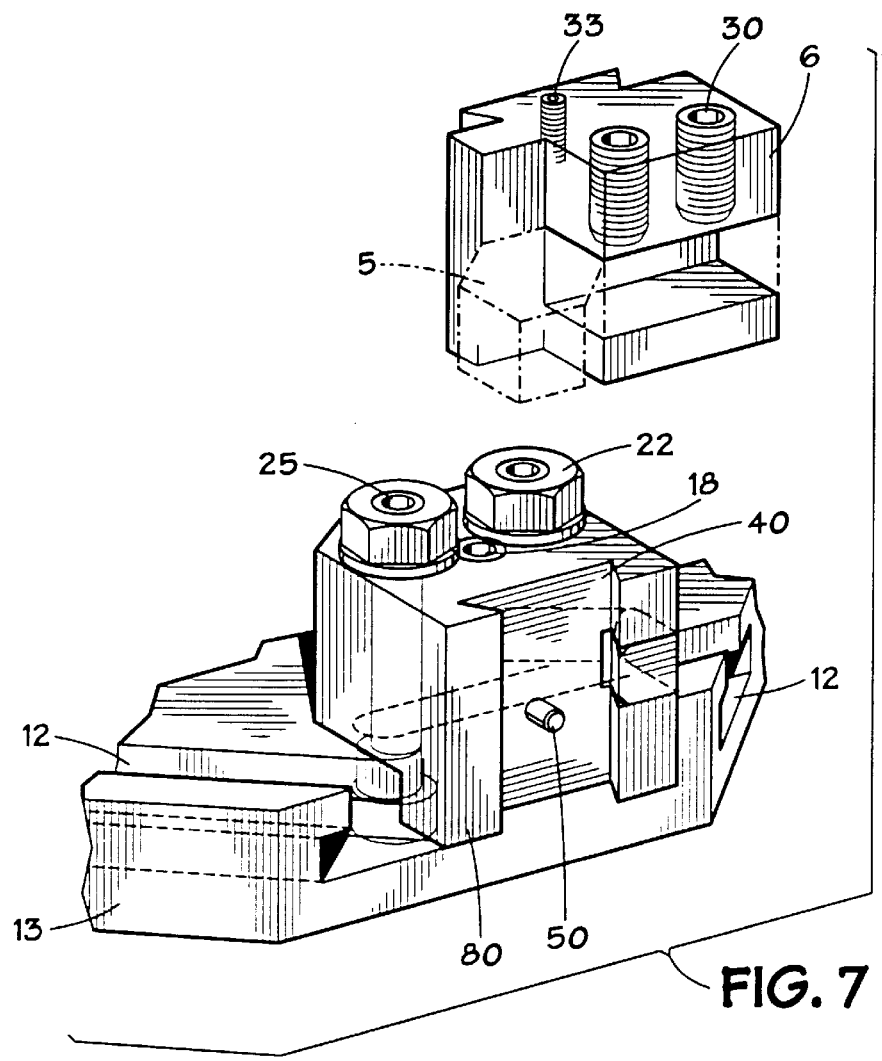
FIG. 7 illustrates a perspective, partially phantom view of the interrelationship between the base and the toolholder.

Once base 4 is situated in a desired location along slot 12, it is secured about said slot 12 by rotation of bolt 24 and hence cam 27 as illustrated in FIG. 5. The eccentric offset defined by cam 27 is desirably narrow enough to allow bolt 24 to slide easily through the upper portion 21 of slot 12 in a first orientation, but wide enough to securely engage the walls defining said upper portion 21 of slot 12 when oriented in a second orientation. In this to connection, rotation of bolt 24 urges the eccentric shank 27 against the side of said upper portion 21, effectively wedging base 4 in position against the shoulder 44 on base 4. (See FIG. 9.)

Rotation of bolt 24 is accomplished by use of locking means 19 which, in a preferred embodiment, includes a hexagonal counterbore formed in the distal, threaded end 23 of bolt 24 to receive an alien head wrench. Other configurations, however, are also contemplated within the spirit of the present invention. The position of bolt 24 and hence cam 27 is locked in place by tightening nuts 22. The tightening of nuts 22 in this fashion also serves to further secure base 4 to the lathe table 13 through compression and frictional contact.

Figure 8:
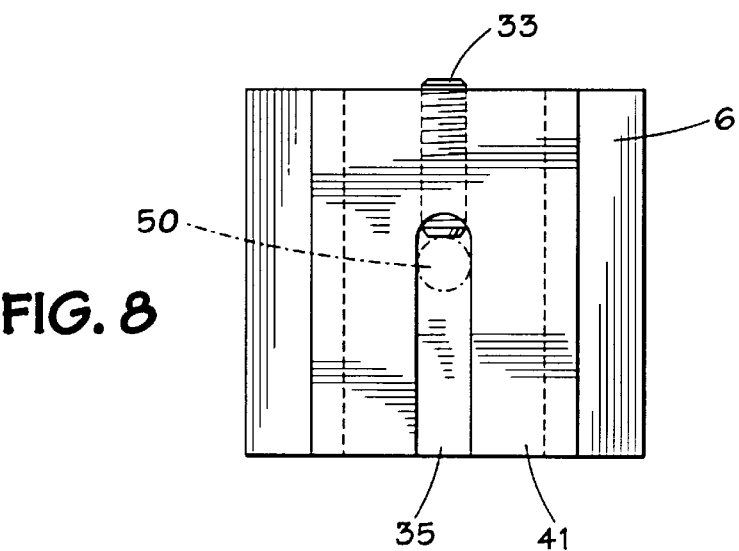
FIG. 8 illustrates a front view of the engagement surface of the base.
Figure 9:
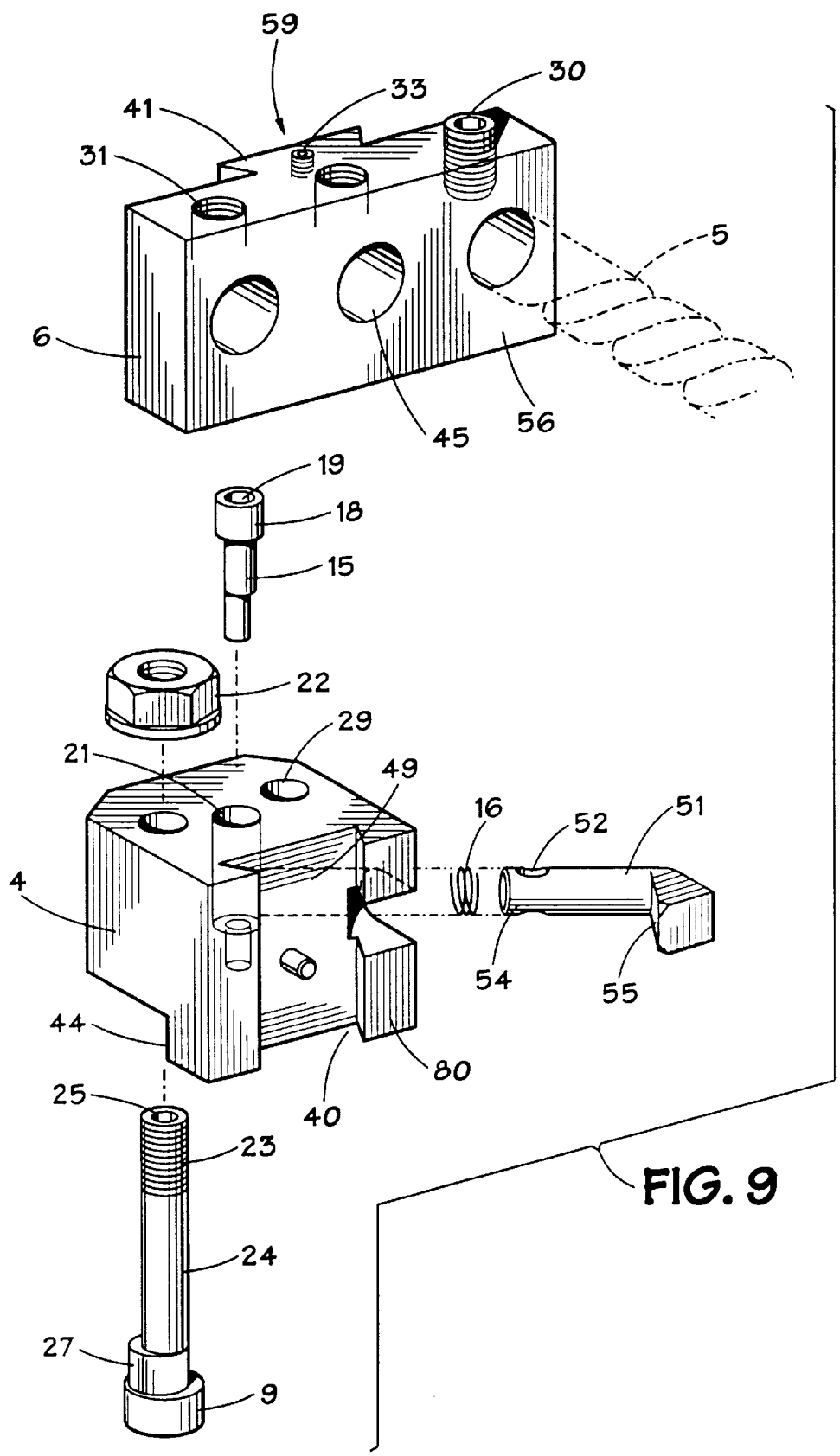
FIG. 9 illustrates an exploded view of the base and toolholder as employed in the embodiment depicted in FIG. 1.

By reference to FIGS. 2–9, base 4 in a preferred embodiment defines at one edge a dovetail groove 40, where said groove 40 defines a longitudinal axis parallel to the rotational axis 10 defined by lathe table 13. Groove 40 is dimensioned to slidably accommodate a complementary tongue 41 forming a portion of the distal, engagement surface 59 of toolholder 6 as illustrated in FIG. 9.

The proximal face of toolholder 4 defines an attachment surface 56 adapted to accommodate one or more tools 5. In FIG. 9, these tools 5 are shown as being attached in a direction perpendicular to the axis 10 of table 13. It is contemplated, however, that said face 56 may adopt a variety of configurations depending on the projected need for the tools to be used in association with a given workpiece. Examples of other such configurations for face 56 may be seen at FIG. 2.

In the embodiment illustrated in FIG. 9, tools 5 may be inserted into holder 6 by the use of grooves or apertures 45 formed in the attachment surface 56. Such tools 5 may be secured therein by the use of threaded set screws 30 receivable in vertically disposed bores 31 formed in said toolholder 6 and positioned in contacting relation to said tool 5 in a conventional fashion such that tightening said set screws 30 securely engages the tool in the groove or aperture 45 to prevent its removal therefrom.

Figure 3:
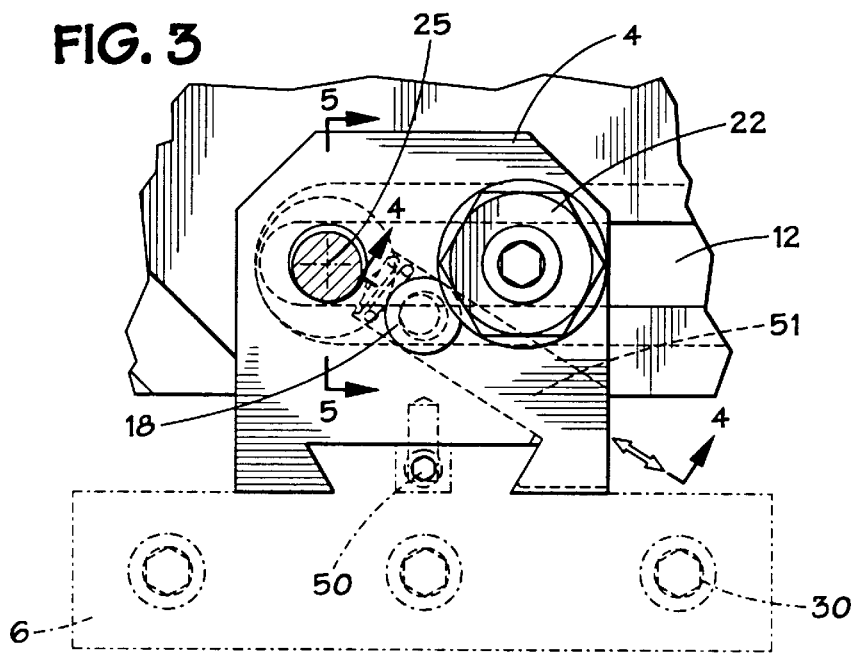
FIG. 3 illustrates a fragmentary, detail view of the embodiment illustrated in FIG. 1, showing the base and the toolholder.
Figure 4:
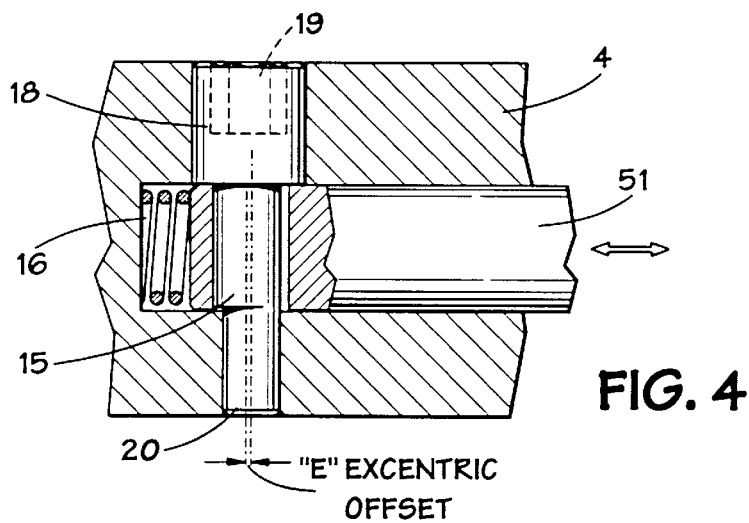
FIG. 4 illustrates a detail, cross-sectioned view taken through the plane described by 4—4 in FIG. 3.

Toolholder 6 is selectively securable relative to base 4 anywhere along groove 40 via the cam locking arrangement illustrated in FIGS. 3–4 and 9. Base 4 further includes a locking element or pawl 51 which is slidably receivable in an aperture 49 formed diagonally in base 4 as illustrated in FIG. 9. Pawl 51 defines a rounded distal end 54, where such end 54 includes a bore disposed perpendicular to its longitudinal axis and receivable to cam pin 18, as will be further discussed herein. Pawl 51 is biased in an "open" or nonengaging position by a spring 16. The proximal end 55 of pawl 51 is L-shaped in configuration so as to substantially conform in shape to the attachment face 80 of base 4 when the distal end 54 is fully inserted in aperture 49 as illustrated in FIG. 3.

In application, diagonal adjustment of pawl 51 to a "closed" or engaging position with respect to tongue 41 is accomplished by tightening cam pin 18 which includes an eccentric shank 15. When cam pin 18 is rotated, pawl 51 is urged inwardly against tongue 41 to a "closed" position, thus engaging said tongue 41 and hence toolholder 6 in a set position in groove 40. In such a fashion, the relative position of toolholder 6 relative to base 4 may be wedged in place in a secure fashion while allowing for easy release and adjustment.

Figure 2:
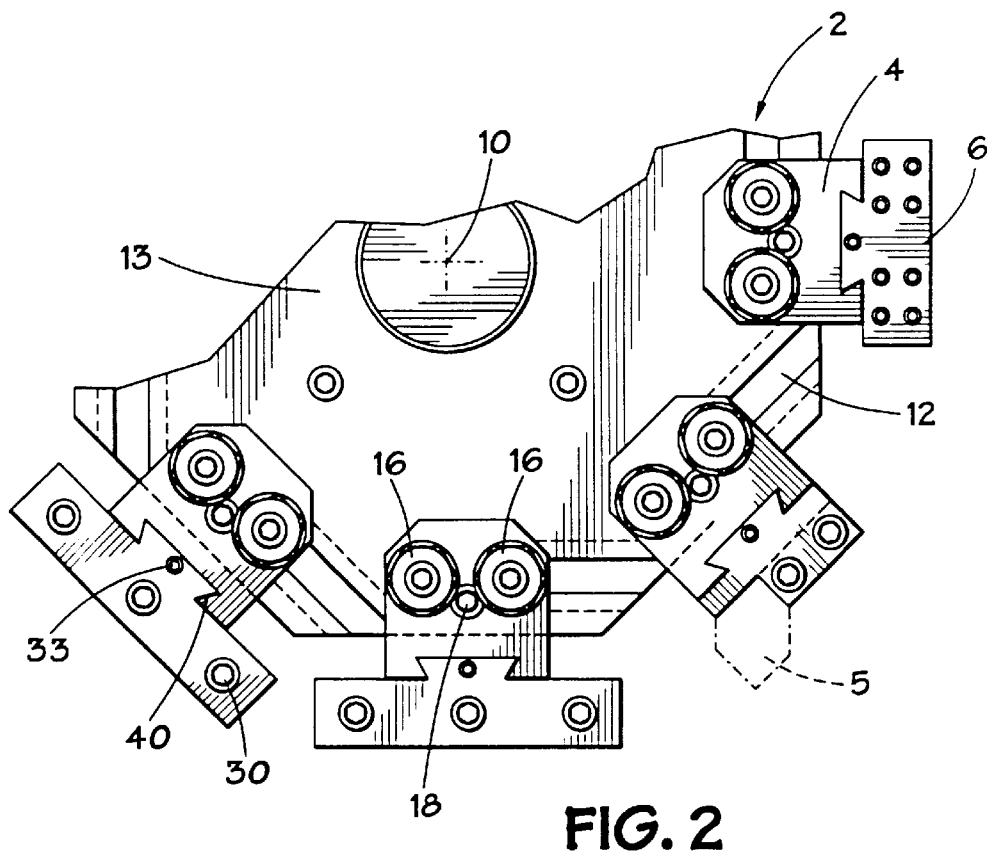
FIG. 2 illustrates a top, detail view of the embodiment illustrated in FIG. 1.

The vertical positioning of toolholder 6 with respect to base 4 may be more precisely adjusted by way of the positioning means illustrated in FIG. 8. FIG. 8 illustrates a cutaway view of the base 4 and toolholder 6 when oriented in contacting relation as illustrated in FIG. 2. FIG. 8 illustrates groove 40 in which is disposed a height adjustment pin 50 which is receivable in slot 35 formed in toolholder 6. Pin 50 acts as a physical stop in groove 35. The relative vertical position of toolholder 6 may be adjusted by use of set screw 33, which is disposed in toolholder 6 in contacting relation to pin 50, such that the rotation of said screw 33 allows fine vertical movement of toolholder 6 with respect to base 4.

A second embodiment of the present invention may be seen by reference to FIGS. 10–15. This embodiment is especially adapted for use in connection with a COBRA lathe machine 88 including a lathe table 81 and defining a horizontal axis 91. By reference to the figures, the second embodiment of the invention comprises a base 84 defining a lower 93 and upper 95 face, where said lower face 93 describes a cylindrically shaped region 96 or rabbet receivable in a complementary recess 82 formed on the lathe table 81. (see FIGS. 10–11). Other configurations for recess 82 and the lower face 93 of base 84 are also envisioned within the spirit of the present invention.

In the embodiment illustrated in FIGS. 10–18, base 84 is secured to the lathe table 81 via a plurality of studs 96 disposed through bores 100 formed in said base 84 and receivable in threaded bore 90 formed in lathe table 81. In conventional embodiments, bores 100 conventionally incorporate at least one thirty-seconds of an inch clearance with respect to the outer diameter of studs 96. This tolerance may be unacceptable to fine milling operation where precision is at a premium. To address this issue, lathe table 81 is further provided with a positioning pin 99 which is accepted in a close tolerance, oversize bore 103. Fine positioning of pin 99 along one axis with respect to bore 103 may be accomplished by use of a set pin 108 which is threadedly disposed in base 84 in contacting relation to pin 99 as illustrated. (See FIG. 12)

The upper face 95 of base 84 defines an engagement surface 120 which includes a dovetail groove 90 (see FIGS. 13 and 14), where groove 90 defines a longitudinal axis 113 tangential to the circumference of the milling table 81 when seen in a top view. By reference to FIGS. 12–14, engagement surface face 120 is defined in part by the proximal end 123 of a locking pin or pawl 104. Pawl 104 is received in base 84 in a diagonally disposed bore when viewed in side section, (see FIGS. 13–14) and comprises a cylindrical distal end 121 and an L-shaped proximal end 123. A bore (not shown) is formed in distal end 121 and is slidably receivable to a cam pin 110 of a design similar to that described above with respect to the CHNC embodiment. The rotation of cam pin 110 inwardly urges pawl 104 into base 84, thus engaging toolholder 86 in a desired "closed" position.

Pawl 104, when not engaged against toolholder 86 is inclined, as a result of the bias provided by a biasing spring (not shown), to slide outwardly out of base 84. The tool holder 86 is provided with a number of apertures 97 to accommodate tools 87, e.g. a drill bit, which tools 87 are secured in said apertures 97 via set screws 86.

Figure 10:
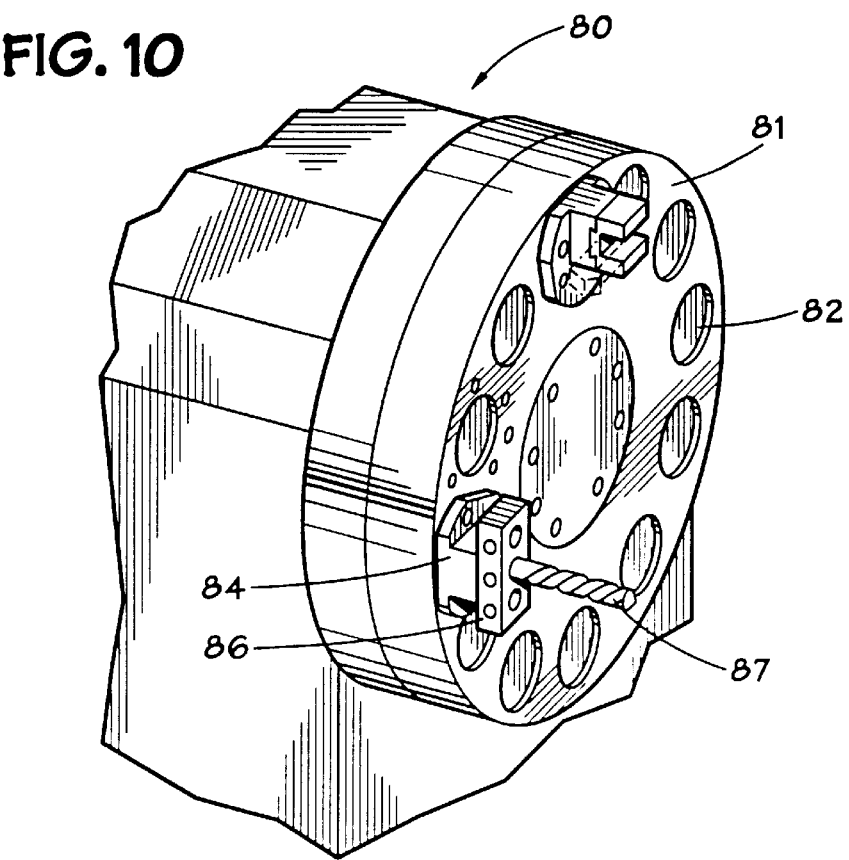
FIG. 10 illustrates a perspective view of a second embodiment of the invention as employed in association with a COBRA tool lathe.
Figure 11:
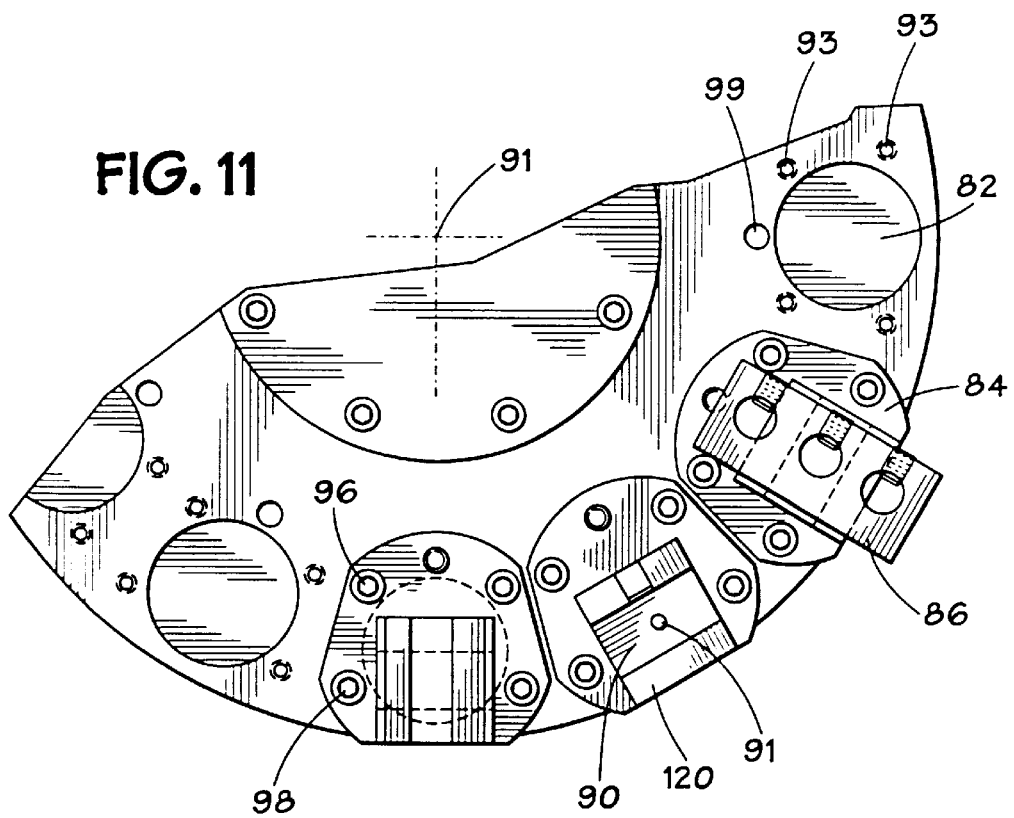
FIG. 11 is a top view of the embodiment illustrated in FIG. 10.
Figure 12:
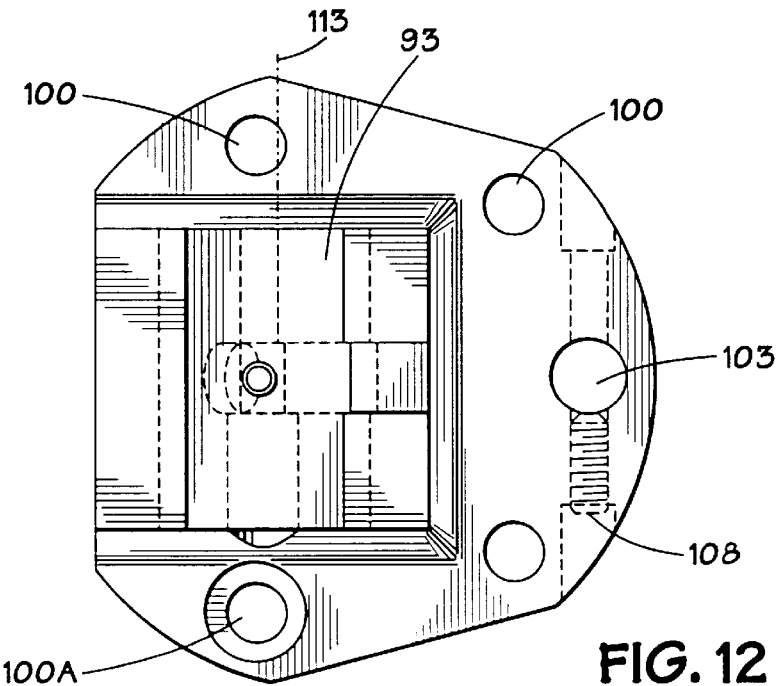
FIG. 12 is a top view of the base of the embodiment illustrated in FIG. 10.
Figure 13:
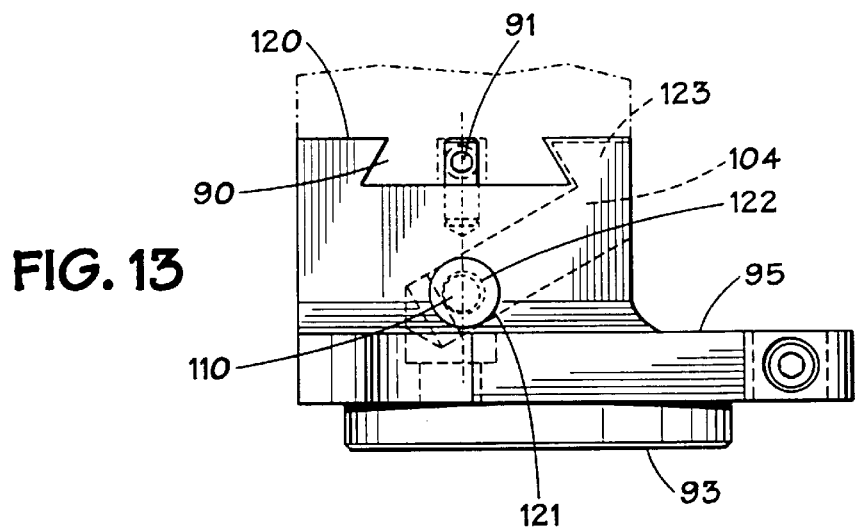
FIG. 13 is a side, partially phantom view of the base vis-a-vis the toolholder.
Figure 14:
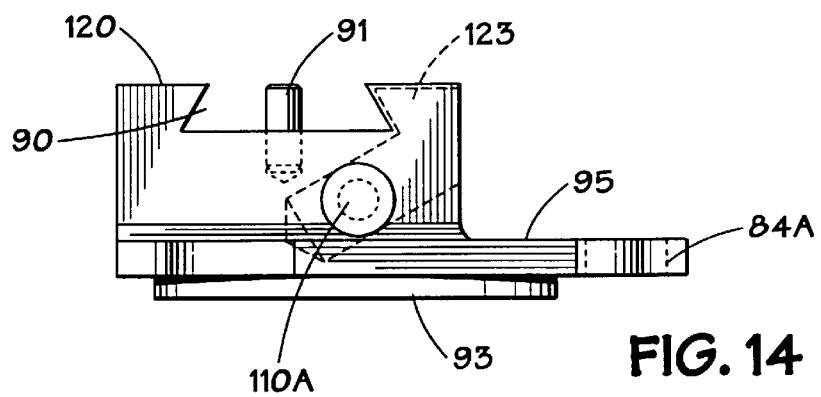
FIG. 14 is a side, partially phantom view of a second embodiment of the base as adapted for use in association with a COBRA lathe.
Figure 15:
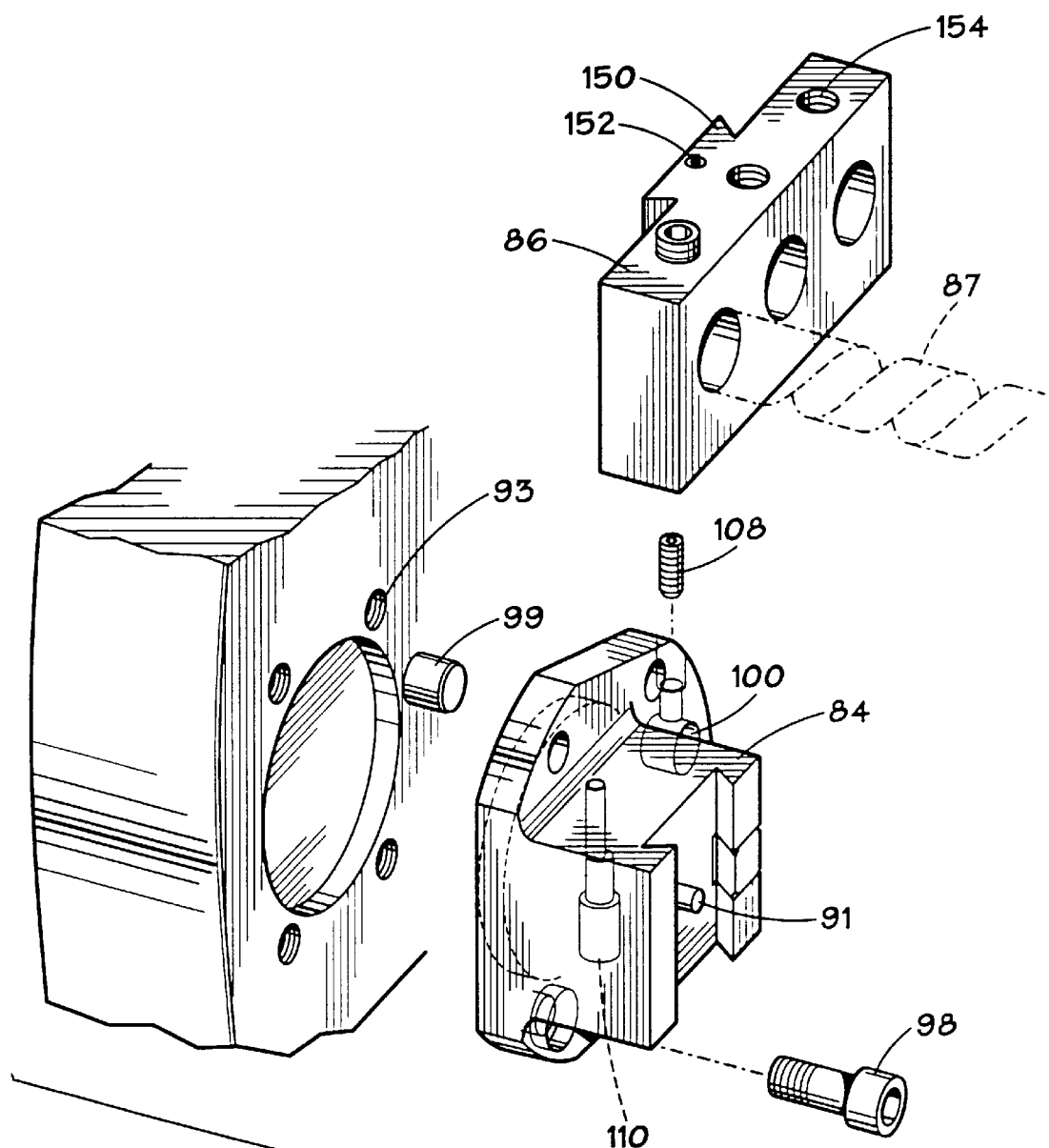
FIG. 15 is an exploded view of the embodiment illustrated in FIG. 10.

FIG. 14 illustrates a modification of the embodiment illustrated in FIGS. 10–11 and 15 in that in FIG. 14 there is illustrated a base 84A having a lower profile of height "H" when viewed in side section. Such a lower profile for base 86A may be desirable with respect to certain workpieces or the use of certain tools. By reference to FIG. 14, it will be noted that the lesser height "H" of base 84A results in the displacement of the bore through which is disposed connecting pin 110 from the centerline, as it was positioned with respect to the embodiment illustrated in FIG. 13, to off-center.

Figure 16:
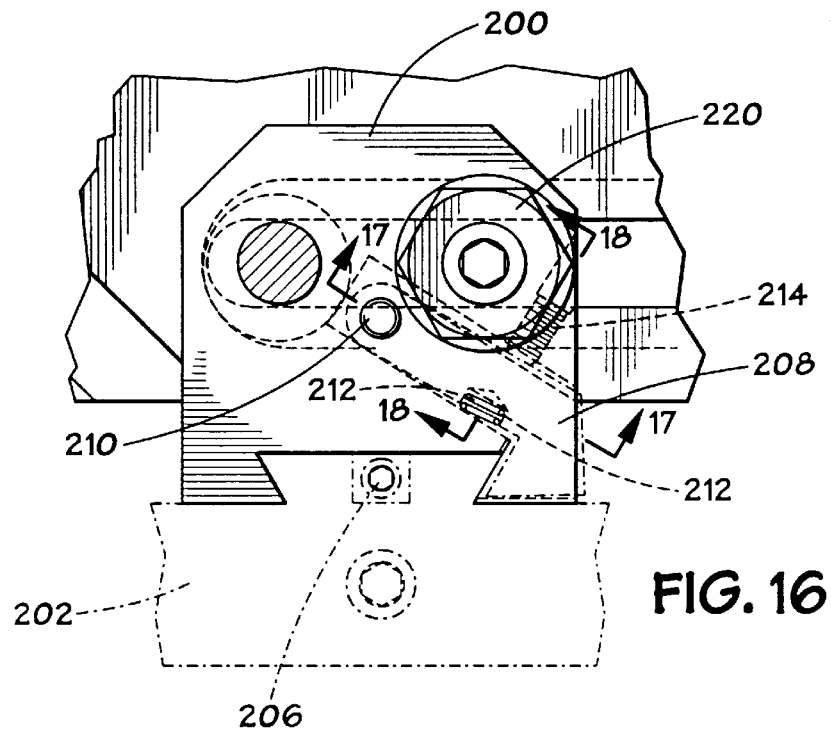
FIG. 16 is a top, partially cutaway view of an alternate embodiment of the base.
Figure 17:
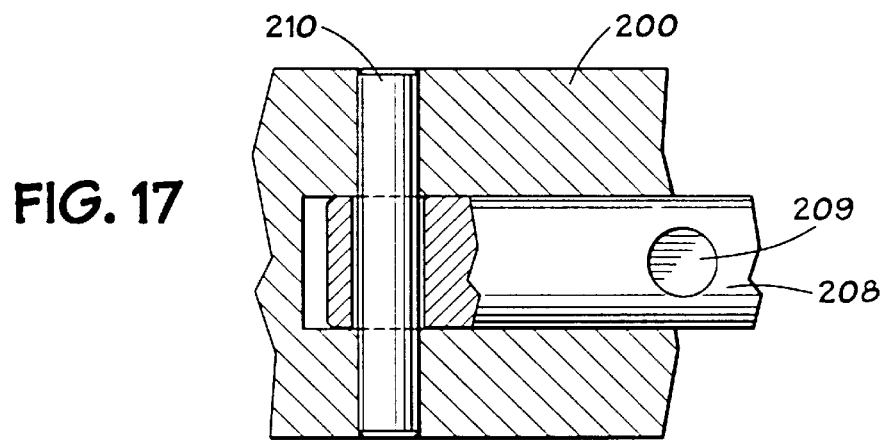
FIG. 17 is a side, cutaway view of the wedging mechanism of the embodiment illustrated in FIG. 16 as taken through plane 17—17.
Figure 18:
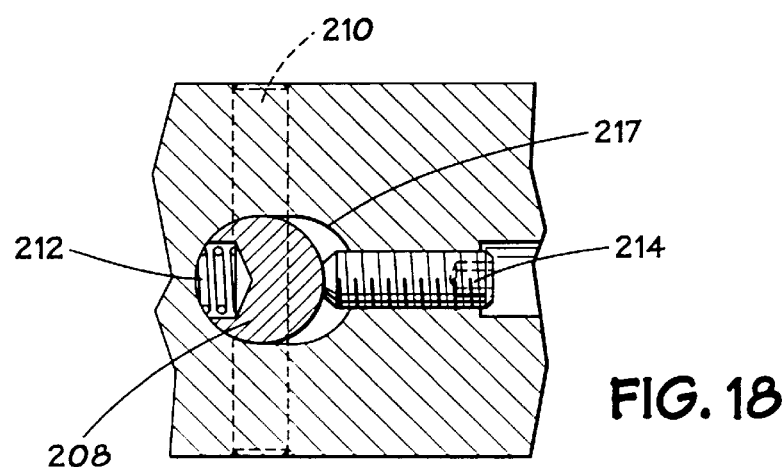
FIG. 18 is a side, cutaway view of the wedging mechanism of the embodiment illustrated in FIG. 16 as taken through plane 18—18.

Yet another embodiment of the invention may be seen by reference to FIGS. 16–18. In this embodiment, pawl 208, instead of incorporating an eccentric locking pin as described above with respect to prior embodiments, pivots about a set pin 210. Pawl 208 is biased in an "open", nonengaging position with respect to toolholder 202 by a spring 212 which is received in bore 209. Pawl 208 is disposed in and laterally moveable about bore 217 from an engaging to an nonengaging position. (see FIG. 18) Pawl 208 is moved to a "closed" or engaging position by the clockwise rotation of set screw 214 which is threaded through base 200 into contacting relation with pawl 208, as illustrated in FIG. 18. In yet another embodiment, a pawl may be threaded on its distal end and disposed in a diagonal bore through the base such that the pawl may be secured with a fastener and pivot about that point. Still alternatively, a pawl may be provided with a threaded counterbore about its proximal end, such that pawl is moveable by the use of a set screw.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. An assembly adapted to hold a tool in a selected position relative to a CHNC lathe turret, where said turret includes attachment slots disposed about its upper surface, comprising:

a base defining an attachment face and an attachment means,
        said attachment means comprising one or more members rotatably disposed about said attachment face and parallel to the axis defined by said lathe turret, where said attachment means is adapted to be slidably receivable in said attachment slots, where said members include a shank having an eccentric wedging surface such that the rotation of said members serves to urge said shank against walls defining the slots disposed in said turret;
        said attachment face defining a dovetailed slot in an engagement surface to receive a toolholder and including means to allow the adjustment of the vertical position of the toolholder relative to said base, and
        means adapted to lock said toolholder in a selected vertical position relative to said base;
    a toolholder defining an engagement surface including a dovetailed protrusion and adapted to be received in said dovetailed slot and the attachment face, where said engagement surface further includes a slot to accommodate said height adjustment means and where said attachment face includes means to secure a tool in a selected position and attitude relative to said lathe turret.

2. The assembly of claim 1 where said height adjustment means includes a pin disposed perpendicular to the axis defined by the lathe turret and a set screw disposed through said toolholder and in contacting relation with said pin.

3. The assembly of claim 1 where said locking means includes a pawl having a proximal and distal end diagonally disposed in said base such that the proximal end forms a portion of the engagement surface, where said distal end is receivable to a rotatable member including an eccentric shank, such that rotation of said rotatable member urges the proximal end of the pawl against the dovetailed protrusion of the toolholder.

4. The assembly of claim 1 where said locking means including a pivoting wedge block diagonally disposed in said base where one end of said block is secured to a pivot pin and the opposite end forms a portion of the engagement surface, where further the block is biased in an "open" position but moveable to a "closed" position against the dovetailed protrusion of the toolholder by a set screw.

5. An assembly adapted to hold a tool in a selected position relative to a lathe turret, where said turret includes a table having means to secure said assembly thereto, comprising:

a base defining a top surface and a bottom surface, where said bottom surface includes means cooperative with said means on said lathe table to secure the base thereto where the top surface defines an engagement surface;
    said engagement surface defining a dovetail groove adapted to sidably receive a toolholder defining a dovetailed protrusion, said groove also including means to selectively adjust the position of said toolholder relative to said base;
    means adapted to secure said toolholder relative to said base;
    a toolholder defining a dovetailed protrusion sidably receivable in the dovetail groove disposed in said base where said base is positioned relative to said turret table by a positioning pin formed on said table and receivable in an aperture formed in said base.

6. The assembly of claim 5 where the orientation of said positioning pin relative to said aperture may be adjusted by a set screw disposed through said base into contacting relation with said pin.

7. An assembly adapted to position a tool in a selected position relative to a rotatable tool table, above said table indicates a rotational axis and an upper surface which at least one positioning slot is formed in said upper surface, the assembly comprising:

a base defing an attachment face and an attachment assembly, said attachment face defining a groove disposed in an engagement surface, which engagement surface adapted to receive a toolholder and including means to allow adjustment of the vertical position of the toolholder relative to the base;

said attachment assembly comprising a "T" shaped element rotatably coupled to said base opposite said attachment face where said element is adapted to be received within said positioning slot, where said element includes a shank having an eccentric wedging surface which upon rotation of said element brings said shank into contacting engagement with the walls defining said slot so as to maintain the position of said base relative to said slot.

8. The assembly of claim 7 further including means to lock said toolholder in a selected vertical position relative to said base.

9. The assembly of claim 8 where said vertical adjustment means includes a pin disposed perpendicular to the axis defined by a lathe turret and a set screw disposed through said toolholder and in a contacting relationship with said pin.

10. The assembly of claim 7 further including a toolholder which defines an engagement surface, a dovetailed protrusion adapted to be received in a dovetailed groove and an attachment face.

11. The assembly of claim 8 where said engagement surface includes a slot to accommodate said vertical adjustment means, where said attachment face includes means to secure a tool in a selected position and altitude relative to the tool table.

12. The assembly of claim 8 where said locking means includes a pawl diagonally disposed in said base such that the proximal end forms a portion of the engagement surface, where said distal end is receivable to a rotatable member including an eccentric shank, such that rotation of said rotatable member urges the proximal end of the pawl against the dovetailed protrusion of the toolholder.

13. The assembly of claim 8 where said locking means including a pivoting wedge block diagonally disposed in said base where one end of said block is secured to a pivot pin and the opposite end forms a portion of the engagement surface, where further the block is biased in an "open" position but moveable to a "closed" position against a dovetail protrusion of the toolholder by a set screw.

* * * * *